May 23, 1961   J. T. WINTERMUTE ET AL   2,985,832
ELECTRICAL MEASURING INSTRUMENTS

Filed May 7, 1958                                   2 Sheets-Sheet 1

WITNESSES:
Bernard R. Gieguey
Leon M. Garman

INVENTORS
Joseph T. Wintermute and
Henry Otzmann, Jr.
BY D. M. Schiller
ATTORNEY

United States Patent Office 2,985,832
Patented May 23, 1961

2,985,832

ELECTRICAL MEASURING INSTRUMENTS

Joseph T. Wintermute, Mountainside, and Henry Otzmann, Jr., Roselle Park, N.J., assignors to Westinghouse Electric Corporation, East Pittsburgh, Pa., a corporation of Pennsylvania Filed May 7, 1958, Ser. No. 733,513

9 Claims. (Cl. 324—151)

This invention relates to electrical instruments and has particular relation to direct-current measuring instruments of the D'Arsonval type. Such instruments include a moving coil assembly which is mounted for movement through the field of a permanent magnet assembly. When the coil assembly is energized a torque results which moves the coil assembly relative to the permanent magnet assembly.

A number of previous constructions of various forms have been utilized. In one known construction, a permanent magnet in the form of a cylindrical core has been employed which is spaced from and surrounded by an annular magnetic return path. A coil assembly is positioned with a coil side extending through the air gap defined by the space between the permanent magnet and surrounding return path.

Another arrangement provides a two-piece permanent magnet assembly of annular configuration which surrounds a non-permanent cylindrical magnetic core in spaced concentric relation therewith. This construction is represented by the Faus Patent No. 1,985,082.

According to the present invention, a direct-current instrument is provided which has a magnetic field arrangement of improved construction. In the present invention, a permanent magnet of integral one-piece construction having a toroidal configuration is provided which surrounds a non-permanent magnetic core of cylindrical configuration in spaced concentric relation to provide an air gap arcuate about the axis of the permanent magnet. The magnetic circuit is completed by the provision of a magnetic band which surrounds the magnet in engagement with the outer lateral surface thereof. The magnet is magnetized radially of its axis to produce magnetic flux which traverses the air gap, the core and the band in directions transverse to the axis.

In a preferred embodiment of the invention, the magnet is formed of a molded mass consisting of a suitable binding material having finely divided parts of a high coercive permanent magnet material agglutinated therein. This mass is pressed into the desired configuration and then permanently magnetized in any suitable manner. The magnet is conveniently molded into the surrounding magnetic band.

In order to provide an efficient magnetic field assembly, the permanent magnet is formed with diametrically opposed sections of reduced cross-sectional area taken in a plane which includes the axis of the magnet. These reduced sections provide integral connections for two halves of the magnet. This construction is effective to minimize the shunting of magnetic flux away from the air gap between adjacent portions of the two magnet halves which contain magnetic poles of opposite polarity.

The invention further provides a direct-current instrument having improved mounting means for mounting the operating parts of the instrument. An integral one-piece supporting member carries the magnetic core and is supported by the permanent magnet to constitute the sole support for the core. This member possesses spaced slots to permit assembly and disassembly of the coil with respect to the core when the supporting member is detached from the permanent magnet.

The invention further provides that the magnetic field assembly is mounted by a pair of spaced post means having parts located beyond opposing end surfaces of the field assembly. These extending parts are spaced by bridges which serve to connect the extending post parts. The post parts are preferably of hollow construction to receive suitable securing means to mount the field assembly rigidly in its operating position.

The connecting bridges conveniently serve to mount the coil assembly in the spaces between the bridges and between the post means for rotation with respect to the magnetic field assembly. A suitable indicating pointer is secured to the coil assembly to traverse a suitable calibrated scale plate. The arrangement is such that the pointer is movable through an angle of approximately 100° about the axis of rotation.

In a further aspect of the invention, suitable pointer stop elements are loosely mounted at opposing ends of the path of movement of the pointer in such path of movement to prevent damage to the pointer when the pointer is energized to move in an off scale direction. Conveniently, the pointer stops are mounted by one of the connecting bridges for displacement with respect to the field assembly in response to engagement thereof by the pointer.

The pointer stops also serve to facilitate the mounting of the scale plate by engaging spaced recesses of the scale plate when this plate is properly positioned for mounting with respect to the pointer. The scale plate is conveniently mounted by the connecting bridge which supports the pointer stops.

A connector device is also provided according to the invention for connecting the coil assembly to input terminals of the instrument either directly or through suitable impedance means, depending upon the particular application of the instrument. The connector is preferably in the form of an electroconductive strip having one end electrically connected to the coil assembly. The strip is mounted for rotation relative to the coil assembly between two spaced positions. In one of these positions, the free end of the strip engages one of the input terminals and in the other position such free end is spaced from the input terminal. At this spaced position, the strip may be connected to suitable impedance means which is connected to the input terminal.

This connector also conveniently serves to mount a coil adjusting device in operative position. For this purpose, the end of the strip which is connected to the coil assembly is in the form of a spring washer and is located to surround a bearing screw for the coil assembly on which the coil adjuster is also mounted.

It is, therefore, an object of the present invention to provide an electrical measuring instrument of improved construction.

It is another object of the invention to provide an improved magnetic field assembly for a direct-current instrument.

It is a further object of the invention to provide a direct-current instrument including a radially magnetized integral permanent magnet of toroidal configuration surrounding a non-permanent magnetic core in spaced concentric relation to define an air gap arcuate about the axis of the magnet for receiving a moving coil assembly.

It is still another object of the invention to provide a direct-current instrument having a magnetic field system supported by a pair of spaced parallel post means with spaced bridges connecting parts of the post means which are located beyond the end faces of the field system for supporting a coil in the spaces between the post means and connecting bridges for rotation with respect to the field system.

It is a still further object of the invention to provide a direct-current instrument having a non-permanent magnetic core surrounded by an annular permanent magnetic means with an integral support member secured to the permanent magnet means to constitute the sole support for the magnetic core.

It is another object of the invention to provide an instrument as defined in the preceding paragraph wherein the integral support is configured to permit ready installation and removal of a coil assembly with respect to the core when the support is detached from the permanent magnet means.

It is another object of the invention to provide an electrical measuring instrument having a magnetic field system with a coil and pointer assembly mounted for rotation relative to the system and pointer stop means mounted in the path of movement of the pointer for displacement relative to the system when the stop means is engaged by the pointer.

It is a further object of the invention to provide an electrical instrument having a moving coil assembly and input terminals for the instrument with a connector electrically connected to the coil assembly and movable with respect to the coil assembly between a first position wherein the connector engages an input terminal and a second position wherein the connector is spaced from the input terminal.

Other objects of the invention will become apparent from the following description taken in connection with the accompanying drawings, in which.

Figure 1:
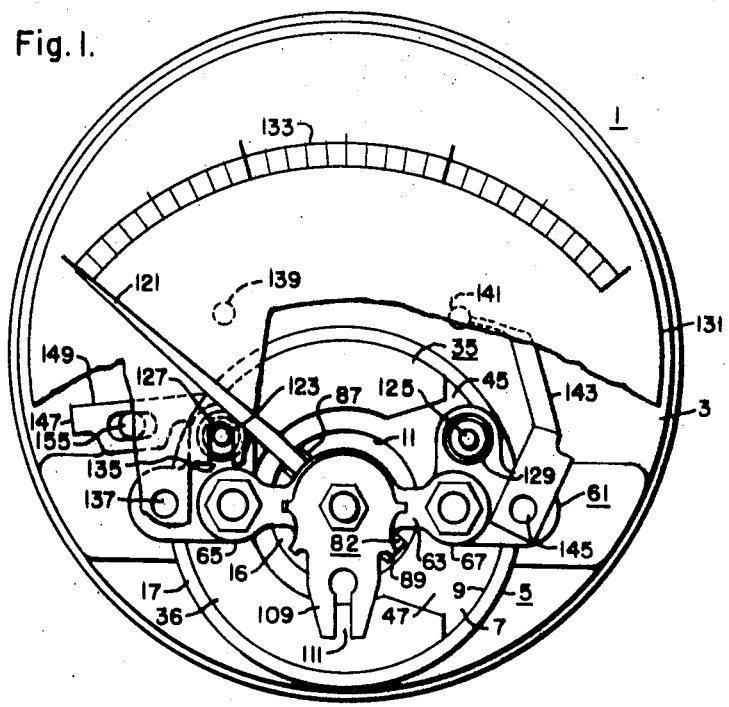
Figure 1 is a plan view of an electrical instrument constructed in accordance with the invention with parts broken away and with parts removed.

Referring to the drawings, there is illustrated in Fig. 1 an electrical measuring instrument represented generally by the numeral 1. The instrument 1 is illustrated in the form of a direct-current instrument of the D'Arsonval type, including a moving coil assembly which is movable through the field of a magnetic field assembly.

The instrument 1 includes a supporting base 3 preferably constructed of a suitable electrical insulating and non-magnetic material for supporting the operating parts of the instrument. A suitable cover assembly, not shown, may be removably associated with the base 3 to provide an enclosure for the parts of the instrument.

Figure 2:
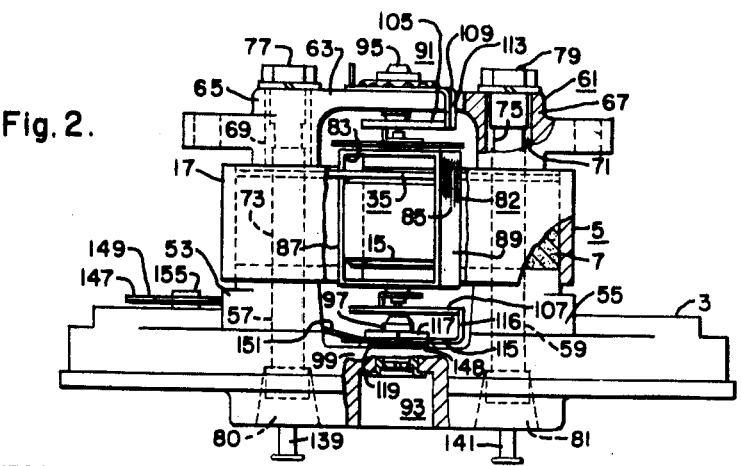
Fig. 2 is a view in side elevation of the instrument of Fig. 1, with parts shown in section.
Figure 4:
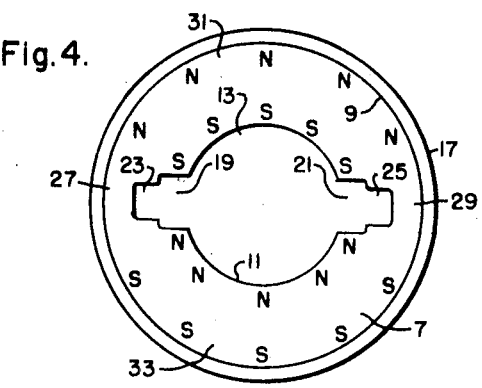
Fig. 4 is a plan view of a portion of the field assembly of Fig. 3.

The instrument 1 further includes a magnetic field assembly 5 consisting of a permanent magnet 7 for establishing a magnetic field through which a coil assembly described hereinafter is movable. According to the present invention, the magnet 7 is of integral one-piece construction having a toroidal configuration which is rectangular in cross section as best shown in Figs. 2 and 4. The magnet 7 includes an outer lateral surface 9 and an inner lateral surface 11 defining a central opening 13 of the magnet as shown in Fig. 4. The magnet is permanently magnetized radially of its axis so that magnetic flux flows in directions extending transverse to the axis of the magnet. Further details of construction of the magnet 7 will be described hereinafter.

Figure 3:
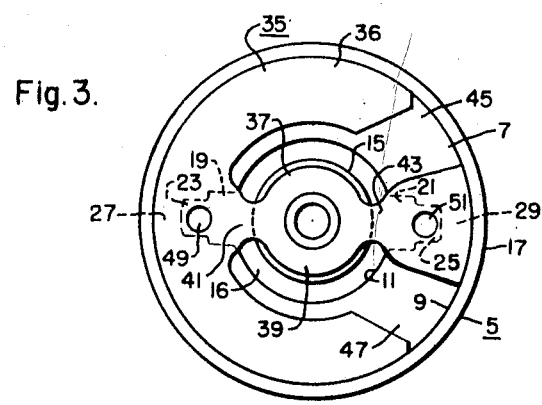
Fig. 3 is a plan view of the magnetic field assembly of the instrument of Fig. 1.

In order to provide an efficient magnetic field assembly, the invention provides a cylindrical core 15 which is preferably formed of a suitable non-permanent magnetic material, such as soft iron. As best shown in Fig. 3, the core 15 is located in the opening 13 of the magnet in spaced concentric relation with the magnet to define with the inner surface 11 an air gap 16 which is arcuate about the axis of concentricity.

In order to complete the magnetic circuit of the field assembly 5, the invention provides a band or ring 17 formed of a suitable non-permanent magnetic material which surrounds the magnet 7 in engagement with the outer surface 9 thereof. It is noted with reference to Fig. 2 that the band 17 has end portions which project beyond the opposing end faces of the magnet 7. With the construction as described, magnetic flux from the magnet 7 flows through the air gap, the core and the magnetic band in directions extending transverse to the axis of the field assembly.

The permanent magnet 7 is constructed according to the invention by molding a mass consisting of a binding material having finely divided particles of permanent magnetic material agglutinated therein. Any suitable binding material may be employed. For example, the binding material may comprise a phenol formaldehyde resin. The permanent magnetic material may be in the form of finely divided particles of an alloy of nickel, aluminum, iron and cobalt known as Alnico having high coercivity and a high remanence. The powdered permanent magnetic alloy is thoroughly mixed with the binding material and this mixture is then molded or otherwise formed into a solid mass having the desired configuration and dimensions. The molding may be accompanied by the simultaneous application of heat to the mass if desired. Subsequent to the molding operation, the mass is permanently magnetized to provide the permanent magnet.

The mixture of the magnetic particles and the binding medium may be molded into the magnetic band 17 to provide a very rigid connection between the magnet and band having precise dimensions without the necessity of finish machining, such as grinding of the magnet.

The magnet is subjected to a magnetic field which magnetizes the magnet material in the manner illustrated in Fig. 4. As there shown, the magnet is magnetized radially of its axis such that magnetic poles of one polarity are located adjacent the inner surface 11 of one side of a plane which includes the axis of the magnet, and magnetic poles of the opposite polarity are located adjacent the surface 11 on the other side of this plane. With the arrangement illustrated in Figs. 3 and 4, the magnetic circuit for magnetic flux from the magnet may be traced from the north magnetic poles of the lower section of the magnet as viewed in Fig. 4, through the lower portion of the air gap as viewed in Fig. 3, the magnetic core 15, the upper portion of the air gap as viewed in Fig. 3, the upper section of the magnet as viewed in Fig. 4, and through the return band 17 back to the north magnetic poles of the lower section, as viewed in Fig. 4.

In order to provide an efficient magnetic field assembly with substantially uniform distribution of magnetic flux throughout the air gap, the invention provides that the magnet 7 is formed with a pair of webs each of reduced cross-sectional area taken in a plane which includes the axis of the magnet for connecting two halves of the magnet. These webs exhibit substantial magnetic reluctance and minimize the shunting of magnetic flux away from the air gap through the webs between adjacent portions of the two magnetic halves having magnetic poles of opposite polarity.

As shown in Fig. 4, the magnet 7 is formed with a pair of diametrically opposed recesses 19 and 21 which extend radially of the magnet axis and which open at the end faces of the magnet. The width dimensions of these recesses are made sufficiently large so as to minimize the amount of magnetic flux flowing between the north and south magnetic poles of the two magnet halves which are adjacent the recesses 19 and 21.

For the purpose of further minimizing the shunted magnetic flux and to also permit supporting of the field assembly in the instrument, additional recesses 23 and 25 are provided in the present invention which communicate with the recesses 19 and 21. The recesses 23 and 25 extend radially of the magnet axis toward the outer surface 9 of the magnet and open at the end faces of the magnet. It is observed that the width dimensions of the recesses 23 and 25 are smaller than the corresponding dimensions of the recesses 19 and 21. This arrangement provides a stepped formation of the surface 11 of the magnet, as viewed in Fig. 4. The recesses 23 and 25 form webs 27 and 29 of the magnet having reduced cross-sectional areas which constitute integral connections for two halves 31 and 33 of the magnet. These connections possess substantial magnetic reluctance, thereby minimizing the amount of magnetic flux which flows between adjacent poles of opposite polarity in the magnet halves 31 and 33. As a result, substantially the entire amount of magnetic flux produced by the magnet flows through the air gap portions and the magnetic core 15.

The webs also serve to increase the rigidity and accuracy of the magnet in addition to increasing the magnetic flux which is available. Also, the webs permit a more accurate and effective bond to the surrounding magnetic band 17.

Figure 5:
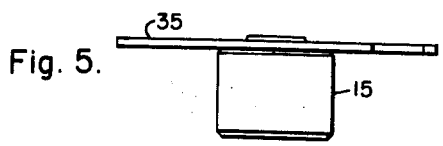
Fig. 5 is a view in side elevation of another portion of the field assembly of Fig. 3.

The present invention also provides improved supporting means for supporting the operating parts of the instrument 1. In the present invention, a nonmagnetic support member of integral one-piece construction is carried by the magnet 7 for mounting the core 15 in its proper position. As illustrated in Figs. 3 and 5, a flat plate 35 having a generally disc-shaped configuration carries the core 15 which may be secured to the disc 35 in any suitable manner, such as by riveting. The plate 35 includes an interrupted peripheral rim portion 36 with an integral bridge 37 connecting diametrically opposed portions of the rim. The core 15 is secured to the enlarged central part 39 of the bridge 37 to be concentrically disposed with respect to the rim 36 in spaced relation thereto. The central part 39 of the bridge is connected to the spaced rim portions by two necks 41 and 43, as best shown in Fig. 3.

As illustrated in Figs. 2 and 3, the plate 35 is proportioned to be snugly received within the area bounded by the protruding portions of the band 17 to engage the upper end face of the magnet 7, as viewed in Fig. 2.

In order to permit installation and removal of an associated coil assembly with respect to the core 15, the plate 35 is provided with a pair of spaced slots which extend radially of the plate through the rim portion 36. These slots are proportioned to receive spaced parallel coil sides of the coil assembly to permit positioning of the coil assembly in surrounding relation with the core 15 as will be described hereinafter. Assembly and disassembly of the coil is effected when the plate 35 is detached from the magnetic field assembly. In order to permit attachment of the plate to the field assembly, the rim section 36 is provided with a pair of diametrically spaced openings 49 and 51 which are positioned to be aligned with the recesses 23 and 25 when the plate is properly positioned with respect to the magnet 7.

In order to permit mounting the magnetic field system 5, the base 3 is provided with a pair of spaced posts 53 and 55 which extend upwardly from the base, as viewed in Fig. 2. These posts contain respectively openings 57 and 59 which extend entirely through the base 3 as seen in Fig. 2. The posts 53 and 55 are proportioned to be received in the area formed by the lower end face of the magnet 7 and the protruding end parts of the band 17 to engage the magnet end face, as illustrated in Fig. 2.

For the purpose of assisting in the mounting of parts of the instrument, there is provided an upper non-magnetic electroconductive bracket as viewed in Fig. 2 of integral one-piece construction having a substantially U-shaped configuration. This bracket is represented by the numeral 61 and includes a central bridge section 63 which connects a pair of spaced parallel posts or legs 65 and 67. The posts 65 and 67 includes respectively openings 69 and 71 which extend entirely therethrough. The bracket 61 is positioned such that the posts 65 and 67 engage the upper face of the plate 35 with the bridge section 63 spaced from the magnet end face, as clearly shown in Fig. 2. When the bracket is so positioned, the openings 69 and 71 are aligned with the recesses 23 and 25 of the magnet.

In order to secure the bracket 61 and the magnetic field assembly 5 to the base 3, suitable securing means may be passed through the two sets of aligned openings and recesses. In the embodiment illustrated, the securing means may comprise non-magnetic studs 73 and 75 having enlarged heads and threaded end portions. These studs are passed through the sets of aligned openings through cavities 80 and 81 of the base 3, such that the threaded end portions extend through the openings of the bracket 61. Suitable threaded nuts 77 and 79 threadedly engage the end portions of the studs to rigidly secure the bracket 61 and the magnetic field assembly to the base 3. The cavities 80 and 81 are formed with rectangular cross-sectional areas to hold captive the similarly shaped enlarged head portions of the studs.

The moving system of the instrument 1 comprises a coil assembly 82 illustrated in Fig. 2 as including a frame 83 of rectangular configuration which is preferably formed of an electroconductive material, such as aluminum. The frame 83 has wound thereupon a number of turns of electroconductive wire 85 to provide a pair of spaced parallel coil sides of the assembly 82 which are proportioned to extend through diametrically opposed parts of the air gap 16 parallel to the axis of the core 15.

The coil assembly 82 is conveniently installed with respect to the core 15 to surround the core prior to assembly of the plate 35 and core 15 to the field assembly 5. To this end, each of the coil sides 87 and 89 is positioned in a separate one of the slots 45 and 47 of the plate 35 to extend parallel to the axis of the rim 36. The coil assembly is then moved in a direction radially of the axis of the rim through the slots to a position wherein the coil assembly surrounds the core 15. The reverse procedure is effected to disassemble the coil assembly from the plate and core device.

In order to mount the coil assembly 82 for rotation with respect to the field assembly, a pair of spaced upper and lower bearing assemblies 91 and 93 are provided. The upper assembly 91 includes a bearing screw 95 which is threadedly received in a threaded opening of the central section 63 of the bracket 61. The lower assembly 93 similarly includes a bearing screw 97 which is threadedly contained in a threaded opening of a bridge section 99 of the base 3 which connects the posts 53 and 55. Suitable pivots are secured to the coil assembly in a line parallel to and intermediate of the coil sides 87 and 89 to engage the bearing screws 95 and 97.

In order to bias the moving coil assembly toward its zero indicating position, a pair of spiral bias springs 105 and 107 are provided. Each of these springs has its inner end secured to the coil assembly and its outer end secured to a portion of an adjustable member carried by the support means of the instrument.

These adjustable members are provided for the purpose of adjusting the bias exerted by the bias springs to thereby adjust the position of the coil assembly. This permits a setting of the associated indicating pointer to a zero position when the instrument is deenergized. One of the adjustable members 109 is in the form of a plate having an opening through which the screw 95 extends and a slot 111 as shown in Fig. 1. The member 109 includes further a depending leg 113 illustrated in Fig. 2, which is secured as by soldering to the outer end of the bias spring 105. The slot 111 receives a projection of the cover, not shown. This projection is rotatable from a position externally of the cover to effect the adjustment.

A similar adjustment is provided by the adjuster 115 which is in the form of a disc having a central opening through which the bearing screw 97 extends. The adjuster 115 is provided with a depending leg 116 which is secured to the outer end of the bias spring 107. The adjuster 115 is mounted for rotation about the axis of the bearing screws to effect adjustment of the coil assembly by means of a threaded nut 117 which threadedly engages the bearing screw 97 and by means of a spring washer 119. The adjuster 115 is positioned between the nut 117 and the washer 119, such that the nut bears against the adjuster to force the spring washer into biased engagement with the bridge 99 of the base 3.

As illustrated in Fig. 1, a suitable indicating pointer 121 is secured to the coil assembly 82, such that the pointer is included in a plane which also includes each of the coil sides 87 and 89. With the arrangement illustrated in Fig. 1, the coil assembly and pointer are rotatable about the axis of the permanent magnet through an angle of approximately 100° about the axis of rotation.

In order to prevent damage to the pointer in response to movement thereof beyond its defined range, the invention provides a pair of spaced stop elements 123 and 125 which are loosely mounted by the supporting structure in the path of movement of the pointer 121. As illustrated in Fig. 1, the stops 123 and 125 are in the form of cylindrical pins which reside loosely in pockets 127 and 129 formed in extensions of the posts 65 and 67 of the bracket 61. The pins and pockets are proportioned such that engagement of the pins by the pointer results in displacement of the pins in the direction of pointer travel, thereby minimizing the likelihood of damage to the pointer resulting from such engagement. The pins are also displaced about their axes in response to engagement thereof by the pointer so as to present different surface portions to the pointer for each engagement.

The pointer 121 traverses a scale plate 131 which is located beneath the pointer 9 as viewed in Fig. 1 and which contains a suitably calibrated scale 133. The scale plate 131 includes a pair of spaced recesses, only one of which is shown in Fig. 1 represented by the numeral 135. These recesses are located in the plate 131 so as to receive the stops 123 and 125 when the scale plate is in its proper position with respect to the supporting structure and pointer. The scale plate includes further a pair of openings, only one of which is shown, which is represented by the numeral 137. These openings are positioned to receive suitable securing screws which extend through openings formed in projections of the posts 65 and 67 of the bracket 61. When the recesses 135 are in engagement with the stops 123 and 125, the openings 137 of the scale plate will be aligned with the corresponding openings of the bracket 61 to permit passage of the securing screws therethrough.

In order to permit energization of the moving coil assembly, a pair of spaced electroconductive input terminals 139 and 141 are provided which are conveniently carried by the base 3. These terminals extend entirely through the base and have portions located on opposing sides of the base. For the purpose of connecting the moving coil assembly to the terminals 139 and 141, electroconductive connecting means are provided. As shown in Fig. 1, an electroconductive flexible strip 143 has one end which is connected to one of the terminals such as the terminal 141, with the other end connected to the bracket 61 by suitable securing means which pass through an opening 145 of the strip 143 and an opening of the bracket 61.

An additional connector is provided to connect the remaining input terminal to the coil assembly. For this purpose, a flexible electroconductive strip 147 is provided which has an end electrically connected to the coil assembly. In accordance with the invention, the end of the strip 147 which is connected to the coil assembly also serves as the spring washer 119. This strip end has an opening through which the bearing screw 97 extends. As viewed in Fig. 2, the spring end also includes a plurality of spaced depending resilient feet 148 which are biased into engagement with the base 3 through action of the nut 117.

The invention further provides that the strip 147 is rotatable about an axis between a pair of spaced positions to permit connection of the coil assembly either directly to one of the input terminals or through suitable impedance means, depending upon the particular application of the instrument. For this purpose, the strip 147 may be rotated about the axis of the bearing screws to move the free end 149 thereof between the terminal 139 and an insulating projection 155 of the base 3 which is located on the same radius as the terminal 139 from the axis of the bearings.

The free end 149 of the strip 147 has an opening 157 for receiving either the terminal 139 or the projection 155, depending upon the position of movement of the strip 147. When the strip is positioned to engage the projection 155, it may be connected to a terminal of suitable impedance means, the other terminal of which may be connected to additional impedance means or to the terminal 139.

The coil assembly is energized by current which traverses a path including the terminals 139 and 141, the strips 143 and 147, a portion of the bracket 61, the adjusters 109 and 115, the springs 105 and 107 and the coil assembly.

With the arrangement described the distribution of markings on the scale 133 is substantially uniform. For certain purposes it may be desired to modify such uniform distribution to provide a non-uniform scale distribution. This may be accomplished in a number of ways. For example, the core 15 may be shaped to provide an air gap of non-uniform length to thereby change the flux density distribution compared to that obtained in a uniform gap. If desired, the magnet 7 may be non-uniformly magnetized and be employed with a uniform air gap to obtain a particular non-uniform scale distribution.

Although the invention has been described with reference to certain specific embodiments thereof, numerous modifications are possible and it is desired to cover all modifications falling within the spirit and scope of the invention.

We claim as our invention:

1. A magnetic assembly comprising a toroidal body of integral construction formed of permanent magnetic material and having inner and outer peripheral walls and end walls through which extends the axis of generation of said toroidal body, said body being magnetized in directions extending radially of said axis such that first magnetic poles of one polarity are located adjacent said body inner wall on one side of a plane containing said axis, and second magnetic poles of the opposite polarity are located adjacent said inner wall on the other side of said plane, said inner wall having a pair of diametrically opposed radially extending first recesses opening through said end walls, each of said first recesses communicating with a separate radially extending second recess, each of said second recesses opening through said end walls to receive support means for said body, said recesses cooperating with said body to provide a pair of spaced restricted cross-sectional area portions extending transversely through said plane, and a non-permanent magnetic ring surrounding said body in intimate engagement with said body outer wall, said ring having a higher permeability than the material of said body.

2. In an electrical instrument, a magnetic assembly including a pair of spaced concentric magnetic members defining an air gap arcuate about the axis of concentricity, one of said members being permanently magnetized to produce magnetic flux which traverses the air gap and the other of said members in directions radially of said axis, a pair of spaced post means extending along lines substantially parallel to said axis which intersect the magnetic assembly, each of said post means engaging the magnetic assembly and having sections positioned beyond the ends of the magnetic assembly, a pair of spaced bridge portions each extending between the pair of post sections at a separate end of the magnetic assembly, a pair of spaced bearing means each carried by a separate one of said bridge portions, a coil assembly including a coil side, said bearing means mounting said coil assembly in the spaces between said bridge portions and said post means with said coil side extending parallel to said axis through the air gap for rotation about said axis, an indicating pointer carried by said coil assembly, said pointer being included in a plane which also includes said axis and said coil side, spaced stop means mounted by said post means in the path of movement of said pointer, one of said bridge portions having apertures loosely receiving said stop means for movement relative to said post means, each said stop means having an outwardly facing shoulder and a flate scale plate carried by said one bridge portion in a plane transverse to said axis to cooperate with said pointer, said scale plate including spaced recesses positioned to individually receive said stop means when said plate is in its proper position for mounting, said plate being engageable with said shoulders to hold said stop means in said apertures.

3. In an electrical instrument, a cylindrical magnetic core, a permanent magnet assembly comprising a toroidal body having inner and outer peripheral surfaces and having end surfaces through which the axis of generation of said body extends, said body being of molded integral construction and being formed of a binding medium with finely divided magnetic material agglutinated in said medium, said core being of lesser diameter than said inner peripheral surface and located within said magnet in spaced concentric relation therewith to provide a cylindrical constant radius air gap, a non-permanent magnetic band surrounding said body in intimate engagement with said outer peripheral surface, said body being molded directly to said band, said inner peripheral surface having diametrically opposed recesses each opening through said end surfaces, said recesses providing reduced sections of said body which form integral connections of increased magnetic reluctance which divide said body into two halves, said body being magnetized radially of said axis to have magnetic poles of one polarity adjacent said inner peripheral surface of one half of said body and to have magnetic poles of the opposite polarity adjacent said inner peripheral surface of the other half of said body, a coil assembly including a pair of spaced coil sides, and means mounting said coil sides in said air gap for rotation about said axis, said reduced sections and said recesses being proportioned to minimize the magnetic flux which is shunted from the air gap through adjacent connected portions of said magnet halves.

4. In an electrical instrument, an insulating base, a magnetic assembly, a coil assembly having two ends, means including a bearing screw carried by said base for supporting said coil assembly for rotation about the axis of said screw, a plate having a central opening through which said screw extends, a spiral bias spring connected between one end of said coil assembly and said plate, a nut in threaded engagement with said screw to engage one side of said plate, an electro-conductive strip having a pair of spaced ends one of which has an opening and a plurality of spaced resilient depending feet, said screw extending through said opening with said one strip end in engagement with the other side of the plate to have said feet in biased engagement with said base, a pair of input terminals carried by said base, said strip being rotatable about said axis to permit movement of the other end of said strip between first and second spaced positions, said other strip end engaging one of said terminals at said first position, and being spaced from said one terminal at said second position, and means connecting the other of said terminals to the other end of said coil.

5. In an electrical instrument, a first toroidal member of magnetic material and having concentric inner and outer peripheral walls and spaced end walls joining said peripheral walls, a cylindrical member of magnetic material and having an outer cylindrical wall and spaced end walls, one of said materials being permanent magnetic material, the distance between said end walls of said toroidal member being substantially equal to the distance between said end walls of said cylindrical member, a ring member of non-permanent magnetic material having an inner wall surrounding and in intimate engagement with said outer peripheral wall of said toroidal member, said ring member having guide portions extending beyond one of said end walls of said toroidal member, a C-shaped plate-like supporting member of non-magnetic material having a first surface thereof seating against said one end wall of said toroidal member and having an outer wall portion with spaced portions engaging said guide portions of said ring member to accurately locate said supporting member relative to said toroidal member, said supporting member having an integral bridge portion overlying the center of curvature of said toroidal member, means securing one end wall of said cylindrical member to said bridge portion whereby said bridge portion holds said cylindrical member concentric with said inner peripheral wall, said last named means being the sole support for said cylindrical member, and means securing said supporting member to said one end wall of said toroidal member.

6. In an electrical instrument, an insulating base, a magnetic assembly, a coil assembly having two ends, means including a bearing screw carried by said base for supporting said coil assembly for rotation about the axis of said screw, a plate having a central opening through which said screw extends, a spiral bias spring connected between one end of said coil assembly and said plate, a nut in threaded engagement with said screw to engage one side of said plate, an electroconductive strip having a pair of spaced ends, means resiliently securing one end portion of said strip to said base and including said screw whereby said strip may be rotatively adjusted about said screw, a pair of input terminals carried by said base, said strip being rotatable about said axis to permit movement of the other end of said strip between first and second spaced positions, said other strip end engaging one of said terminals at said first position and being spaced from said one terminal at said second position, and means connecting the other of said terminals to the other end of said coil.

7. In an electrical instrument, a base member having an outwardly facing surface, a pair of spaced studs of non-magnetic material carried by said base and extending outwardly of said surface, a magnetic assembly comprising a high permeability ring and a toroidal permanent magnet having spaced radially extending end surfaces positioned within said ring, said toroidal magnet having an inner peripheral surface and an outer peripheral surface, said outer surface seating against said ring, said magnet having a pair of diametrically spaced apertures opening through said inner peripheral surface and outwardly of said end surfaces, said magnet assembly being positioned with one of said end surfaces against said base member surface, said studs extending through said apertures and outwardly of the other of said end surfaces of said base member, said studs being cooperable with the walls of said apertures to locate said magnet assembly on said base member surface, said ring having locating portions extending axially outwardly of said other base member end surface, a non-magnetic disc member having an interrupted peripheral rim including a rim opening and a diametrically extending integral bridge extending from an intermediate portion of said rim into said rim opening, said disc member having peripheral portions seating against said locating portions of said ring, a cylindrical member of magnetic material carried by said disc member and located concentrically within said toroidal magnet, said cylindrical member having an outer peripheral surface spaced from said inner peripheral surface of said toroidal magnet to provide an annular air gap, a coil assembly including a pair of spaced coil sides, and means mounting said coil sides in said air gap for movement through said gap and carried at least in part by said studs.

8. A magnetic assembly comprising a toroidal body of integral construction formed of permanent magnetic material and having inner and outer peripheral walls and end walls through which extends the axis of generation of said toroidal body, said body being magnetized in directions extending radially of said axis such that first magnetic poles of one polarity are located adjacent said body inner wall on one side of a plane containing said axis and second magnetic poles of the opposite polarity are located adjacent said inner wall on the other side of said plane, said inner wall having a pair of diametrically opposed radially extending recesses opening through said end walls, said recesses cooperating with said body to provide a pair of spaced restricted cross-sectional area portions extending transversely through said plane, and a non-permanent magnetic ring surrounding said body in intimate engagement with said body outer wall, said ring having a higher permeability than the material of said body.

9. A magnetic assembly comprising a toroidal body of integral construction formed of permanent magnetic material and having inner and outer peripheral walls and end walls through which extends the axis of generation of said toroidal body, said body being magnetized in directions extending radially of said axis such that first magnetic poles of one polarity are located adjacent said body inner wall on one side of a plane containing said axis and second magnetic poles of the opposite polarity are located adjacent said inner wall on the other side of said plane, said inner wall having a pair of diametrically opposed radially extending recesses opening through said end walls, said recesses cooperating with said body to provide a pair of spaced restricted cross-sectional area portions extending transversely through said plane, and a non-permanent magnetic ring surrounding said body in intimate engagement with said body outer wall, said ring having a higher permeability than the material of said body, said ring extending beyond each of said end walls of said body.

References Cited in the file of this patent

UNITED STATES PATENTS

| | | |
|---|---|---|
| 1,597,256 | Weston | Aug. 24, 1926 |
| 1,927,346 | Lawrence | Sept. 19, 1933 |
| 1,985,082 | Faus | Dec. 18, 1934 |
| 2,110,680 | Rowell | Mar. 8, 1938 |
| 2,394,113 | Seaver | Feb. 5, 1946 |
| 2,430,317 | Wilson | Nov. 4, 1947 |
| 2,607,812 | Lederer | Aug. 19, 1952 |
| 2,704,349 | Sheehan | Mar. 15, 1955 |
| 2,724,174 | Mendelsohn | Nov. 22, 1955 |
| 2,837,716 | Wolferz | June 3, 1958 |

FOREIGN PATENTS

| | | |
|---|---|---|
| 563,442 | Great Britain | Aug. 15, 1944 |

OTHER REFERENCES

Publication, Permanent Magnet Manual No. 2, by the Indiana Steel Products Co., Valparaiso, Indiana, Sept. 16, 1943. Pages 16 and 23 are relied on.